United States Patent [19]

Santiago

[11] 4,337,183

[45] Jun. 29, 1982

[54] POLYURETHANE AND POLYETHYLENE RESIN-CONTAINING PRINTING INK HAVING IMPROVED PHYSICAL AND MECHANICAL PROPERTIES

[75] Inventor: Edgardo Santiago, Toledo, Ohio

[73] Assignee: Owens-Illinois, Inc., Toledo, Ohio

[21] Appl. No.: 248,160

[22] Filed: Mar. 30, 1981

[51] Int. Cl.$^3$ ............................................. C08L 91/08
[52] U.S. Cl. ..................................... 524/446; 106/23; 106/31; 106/32; 260/DIG. 38; 524/507; 524/276; 524/475
[58] Field of Search ................. 260/28.5 A, 29.2 TN, 260/DIG. 38; 106/23, 31, 32

[56] References Cited

U.S. PATENT DOCUMENTS

| | | | |
|---|---|---|---|
| 3,461,092 | 8/1969 | Story | 260/28.5 |
| 4,014,833 | 3/1977 | Story | 260/29.2 EP |
| 4,231,911 | 11/1980 | Santiago | 260/29.6 NR |

*Primary Examiner*—Theodore E. Pertilla
*Attorney, Agent, or Firm*—E. J. Holler; M. E. Click; D. H. Wilson

[57] ABSTRACT

The present invention relates to an aqueous printing ink composition and method for improving printing using such aqueous based printing inks. The composition is comprised of a physical mixture of polyurethane resin, polyethylene resin and water as the vehicle. The invention provides a family of water-based inks with enhanced physical and mechanical properties. The inks have superior abrasion resistance and good adhesion to various substrates including metal and plastics.

11 Claims, No Drawings

POLYURETHANE AND POLYETHYLENE RESIN-CONTAINING PRINTING INK HAVING IMPROVED PHYSICAL AND MECHANICAL PROPERTIES

BACKGROUND OF THE INVENTION

This invention is directed to an aqueous printing ink composition and a method for improving aqueous printing.

The printing process involves the distribution of ink in a uniform film, the provision of a substrate having a uniform surface, and the transfer of the ink to the substrate in a prescribed pattern. The final transfer of ink from the printing surface to the substrate is accomplished by means of pressure; the final force on the ink film is heavy pressure against a porous surface followed by a tension sufficient to split the ink film.

Flexographic printing is a form of "relief" printing in which an impression is taken from the raised portions of a printing surface. Flexographic printing machines are essentially high-speed web or sheet-fed rotary presses, which print with liquid inks from curved plates, usually made of rubber or other elastomeric or plastic material, attached to a cylinder. An important advantage of flexographic printing is that a uniform film of ink can be printed even on rough papers, because the surface of the rubber plate is sufficiently resilient to be forced into the hollows in the paper.

Flexographic printing can be employed to produce a wide variety of printed material, including waxed or decorative wrappers, aluminum foil, plastic films, newsprint and corrugated papers and cartons. The inking system used in flexographic printing consists essentially of an enclosed duct to limit the evaporation of the solvent, and a simple train of aligned rollers. Ink control is usually obtained by pressure on the end bearings of the inking rollers, which tends to force the rollers apart at the center. Because of this procedure, continuous fine control and correct alignment of rollers is considered to be essential to produce acceptable printing. Although the pressure on the inking rollers may vary appreciably in letter press printing, in contradistinction, flexographic printing requires maintenance of pressure on inking rollers at practically zero. Because of the importance of maintaining such critical inking roller pressure, flexographic inks must be carefully tailored to possess appropriate viscosity or fluidity. In addition, the ink must be sufficiently volatile or penetrative to dry within seconds or less, adhere well to the printing surface, and be odorless when dry. The ink must also be free of any solvents or components which would attack the rubber or plastic printing plates or rollers.

In the case of pigmented inks, which are extensively used because of the color effects and eye appeal of the printed product, the ink should be stable and any pigment which settles out should be readily dispersible by stirring. A considerable amount of research has been expended in attempting to maintain satisfactory flow properties in the inks while at the same time maximizing the degree of pigmentation and improving the ink transfer properties. And at the same time, it is highly desirable to employ water-based inks to avoid organic solvent emissions.

Another widely used printing technique is intaglio printing, which involves taking impressions from recesses engraved or etched below the surface of a plate or cylinder. Presently, the most important type of such printing is rotogravure printing from polished copper electrodeposited on an iron, steel or aluminum base. The design is etched into the copper by photoengraving techniques. Gravure inks rely for drying mainly on solvent evaporation, and therefore, gravure inks usually contain large amounts of hydrocarbon solvents. Not only are these solvents highly flammable, forming explosive mixtures with the atmosphere, but the vapors are also extremely toxic. Because these undesirable properties involve significant expenditures for flameproof electrical equipment, hoods and duct work for containment, and recovery of the solvents, an aqueous rotogravure ink which has suitable ink transfer properties has been needed in the printing field.

DESCRIPTION OF PRIOR ART

U.S. Pat. No. 4,014,833 to A. L. Story, assigned to the same common assignee as the present invention, discloses an aqueous printing ink with polyethylene oxide in small amounts. Also, U.S. Pat. No. 3,461,092 to A. L. Story, similarly assigned, discloses a solid particulate printing ink composition and process for producing same.

Further, U.S. Pat. No. 4,231,911, to the same inventor and assignee as the present invention, relates to an abrasion resistant protective coating composition for foamed plastic substrates, especially those having printing ink decorations thereon.

SUMMARY OF THE INVENTION

The present invention relates to an aqueous printing ink composition which is comprised of a physical mixture of polyurethane resin, polyethylene resin and water as the vehicle. The pigments, and colorants, are added to the vehicle in minor amounts. The invention involves the use of a resinous vehicle to produce a family of water-based inks with enhanced physical and mechanical properties. The printing inks exhibit superior abrasion resistance and also good adhesion to various substrates, including metal and plastics, the latter in the form of films and foams.

A primary object of the present invention is to provide an aqueous printing ink composition having improved applicating and transfer properties, and method of improving such properties in various printing techniques.

Another object of the present invention is to provide an aqueous pigmented flexographic ink which produces stronger imprints having increased color, brilliance and clarity.

Still another object of the present invention is to provide an aqueous pigmented flexographic ink which has increased scuff resistance and substantially no objectionable emissions on drying.

Various other objects and advantages will become apparent from the following detailed description.

DESCRIPTION OF THE PREFERRED EMBODIMENT

This invention is directly concerned with an ink vehicle composition which facilitates producing an ink exhibiting good adhesion, lubricity and abrasion resistance when applied to a substrate by a printing technique such as flexography. More specifically, the vehicle composition comprises a physical mixture of a water-borne aliphatic polyurethane resin and a water-based low molecular weight polyethylene resin. The polyurethane and polyethylene may be mixed together in a solids ratio ranging from 9:1 to 1:1, although the latter ratio is preferred.

An especially-desirable component for preparing the subject vehicle composition consists of an oxidized homopolymer of polyethylene resin and preferably Allied Chemical Polyethylene—Product No. AC-316—having a softening point of 140° C. (284° C.) (ASTM-E-28), a hardness (dmm) of less than 0.5 (ASTM D-5), a density (g/cc) of 0.98 (ASTM D-1505), a viscosity (cps) at 149° C. (300° F.) (Brookfield) of 30,000, and an acid number (mgKOH/g) of 16. The subject material is Food and Drug Administration approved for use in connection with packaging products. Also, Allied Chemical Polyethylene Product No. AC-392—which is equivalent to AC-316 may be used for the stated purposes, both materials being manufactured and sold by Allied Chemical Corporation.

The basic formulation for the AC-316 Product of the polyethylene emulsion non-ionic type is as follows:

|  | PBW |
| --- | --- |
| AC Polyethylene 316 | 40.0 |
| GAF Igepal CO-630 | 10.0 |
| KOH 90% Flake | 1.0 |
| $Na_2S_2O_5$ | 0.4 |

The preferred polyurethane resin is Neorez R-960 which is an aqueous colloidal dispersion of an aliphatic urethane manufactured and sold by Polyvinyl Chemical Industries. This product has wet properties of solids 34±1, PH of 7.5 to 8.5, viscosity (cps) of 400 to 800, density (lbs/gal) of 8.8, excellent mechanical stability, and will pass 5 cycles in its freeze-thaw stability. This product also has the following performance properties:

| CURE SCHEDULE | |
| --- | --- |
| Air Dry | 6 hrs |
| Force Dry | 10 min at 200° F. |
| Hardness | 4 H |
| Tensil Strength | 5000 psi |
| Cure 10 min at 200° F. | |
| Taber Abrasion | 28 mg loss |
| Chemical Resistance | Excellent |

As a non-ionic emulsifier, a preferred material is GAF Igepal No. CO-630, which is a surfactant with a mole ratio of 9 units of ethylene oxide, which units provide 65% of the ethylene oxide contained therein. This material is a polyoxyethylated nonylphenol—more particularly nonylphenoxypoly (ethyleneoxy) ethanol. Such surfactant has a non-ionic character making it useful with either anionic or cationic agents.

Various other non-ionic type emulsifiers can be used such as GAF Igepal CO-610 and CO-710, both of which are generally similar to Product CO-630. Among the various types of anionic emulsifiers which can be used are morpholine oleate, potassium oleate, and sodium oleate.

A low molecular weight alcohol is normally used in the composition to provide three distinct advantages. The alcohol is readily compatible with the emissible from the water-based composition in all proportions. The alcohol provides: (a) long term shelf stability for the composition, (b) printability or lubricity to the system so that it can be flexographically printable, and (c) a depressant of the surface tension and/or coefficient of friction of the system so that it can be more easily printable.

The surface tension of the composition can be further depressed by addition of small amounts of water-miscible silicone fluids. Products such as LE-45 and L-77, which are silicone fluids made and sold by Union Carbide Corporation, can be added to impart higher lubricity to the system, and also serve as a surface tension depressant. It is preferred to add small amounts of silicone fluid, an addition of LE-45 in the amount of less than 1 percent by weight based on the entire system being particularly desirable.

If desired, an ultraviolet tracer can be added to the system, as is conventionally known in the art, so that it can be determined where the material has been printed or applied. This is especially important where the system is basically colorless and transparent, and used in thin film applications.

In preparing a limited quantity of the subject ink composition, such as approximately one gallon, the following constituents are taken by weight and intermixed as set forth hereinbelow:

| COMPONENT | MATERIAL | AMOUNT (by Weight) |
| --- | --- | --- |
| A | Polyethylene Resin (AC-316) | 1660.00 gm |
| B | Polyurethane Resin (R-960) | 1470.00 gm |
| C | Water | 700.00 gm |
| D | Isopropanol | 767.50 gm |
| E | Silicone Fluid (LE-45) | 7.60 gm |
| F | Silicone Fluid (L-77) | 0.23 gm |
| | TOTAL | 3605.33 gm |

With regard to the listed constituents, the following information provides more detailed specifications of the percent by weight of solids content of the preferred commercial materials as supplied:

| COMPONENT | PERCENT SOLIDS | NATURE |
| --- | --- | --- |
| A | 30.0 | Water Emulsion |
| B | 33.3 | Water Dispersion |
| E | 30.0 | Water Emulsion |
| F | 100.0 | — |

Components E and F are both optional for use in improving lubricity and/or reducing the surface tension of the final product depending upon the selected printing process for applying the ink. Where the printing process consists of the flexographic method, these optional constituents are valuable additions to achieve best results where only prescribed surface areas are to be left uncoated.

The preferred procedure for mixing the aforesaid constituents with continuous stirring consists of taking the polyurethane resin (b) and mixing it with the water fraction (c). The latter mixture then is added to the aqueous polyethylene emulsion (a) as the stirring is continued. The low molecular weight alcohol and preferably isopropanol (D) is then added to the mixture with stirring. The optional silicone fluids, components E and/or F, are then added to the mixture with further continuous stirring. Component E is added on the basis of 0.2 percent by weight of the mixture of components A through D. Component F is added on the basis of the mixture of components A through D.

Component E consists of a Union Carbide silicone emulsion designed for use in a wide variety of release and lubricant applications. Such materials are dimethylpolysiloxanes having low surface tension and excellent lubricity for use in the manufacture of printing inks. They serve to facilitate pigment dispersion, impart slip to the ink to improve performance, and assist the printing process by minimizing ink buildup. Component E is a very stable emulsion for addition to printing inks to decrease ink smearing and set-off. The addition of Component E to the aqueous ink system which is also water-dilutable improves flow and leveling properties of the composition.

As stated, the polyurethane resin and polyethylene resin are present in a solids ratio ranging from 1:9 to 1:1, the preferred ratio being 1:1. The composition also includes a low molecular weight alcohol as a printing additive ranging from 0 to 30 percent by weight, based upon the three primary constituents of polyethylene, polyurethane and water, with isopropyl alcohol being added. The foregoing physical mixture is taken as the basis for the major component in the subject printing ink compositions as designated as "Base Component."

The following examples of aqueous printing ink compositions have been formulated in accordance with the present invention, and are representative of such materials having special utility.

EXAMPLE I

| BLACK INK | PERCENT BY WT. |
| --- | --- |
| Base Component | 64 |
| Elftex 8 Carbon Black | 14 |
| Wax MP 22 | 1 |
| Antifoam Agent AF-75 | 1 |
| Clay Pigment 80 | 10 |
| Water | 10 |
| TOTAL | 100% |

EXAMPLE II

| YELLOW INK | PERCENT BY WT. |
| --- | --- |
| Base Component | 62 |
| Benzidine Yellow 274-2861 | 16 |
| Wax MP 22 | 1 |
| Antifoam Agent AF-75 | 1 |
| Clay Pigment 80 | 10 |
| Water | 10 |
| TOTAL | 100% |

EXAMPLE III

| BLUE INK | PERCENT BY WT. |
| --- | --- |
| Base Component | 60 |
| Phthalocyanine Blue 55-3295 | 15 |
| Wax MP 22 | 1 |
| Antifoam Agent AF-75 | 1 |
| Clay Pigment 80 | 10 |
| Water | 13 |
| TOTAL | 100% |

The Base Component of each of the examples has been described hereinabove as an aqueous physical mixture of primarily polyurethane resin and polyethylene resin. It is included in major amount in each of the formulations.

In the case of the black ink, Alftex 8 Carbon Black is a black ink component having good strength, blue tone and excellent dispersion and printability properties, particularly useful for offset inks for news printing. It is available from Cabot Corporation, Special Blacks Division, Boston, Mass.

In the case of the yellow ink, the Benzidine Yellow, Product No. 274-2861, is a colorant pigment available from Sun Chemical Company, Pigments Division, Cincinnati, Ohio. The blue ink colorant, Phthalocyanine Blue-Product No. 55-3295, is available from the same source.

The Benzidine Yellow is a diarylide yellow toner AAOT, having a color index name of Pigment Yellow 14, and a color index number of 21095. It is a powder having a specific gravity of 1.47, a bulk of 0.0815 gallon per pound, and an oil absorption of 44.8. It exhibits very good to excellent resistance to bleeding or degrading in a wide variety of chemical agents or solvents.

The Phthalocyanine Blue is described as a blue pigment having a green shade, a color index name of Pigment Blue 15, and a color index number of 74160. It is a bright blue powder having a specific gravity of 1.57, a bulk of 0.0765 gallon per pound, and an oil absorption of 35. It exhibits excellent resistance to bleeding or degrading in a wide variety of chemical agents or solvents.

The colorant pigment ranges from about 10 to 20 weight percent of the composition, whatever colorant is used.

The wax component of all examples, Product No. MP 22, is a synthetic micronized wax which can be further defined as a basic chain hydrocarbon synthetic wax. It provides excellent slip and good rub properties and is economical for use in most ink and coating formulations. It has a maximum particulate size of about 13 microns and an average particle size of about 4 microns. This product has a density of 0.94 gm/cm$^3$ at 77° F., a melting point of 215°–223° F., a congealing point of 197°–205° F., and a penetration of 1–3 at 77° F. This product MP 22, is available from Micro Powders, Inc., Yonkers, N.Y.

The wax component may be an exudative wax such as an animal, vegetable or mineral wax.

The antifoam agent, Product No. AF-75, is a silicone antifoam emulsion available from General Electric Company, Waterford, N.Y. It is a 10 percent solids antifoam emulsion of polydimethylsiloxane useful for defoaming aqueous systems. It is a low viscosity emulsion assuring ease of handling and dilution. It has a density of 8.4 lbs/gal, a specific gravity of 1.02, a viscosity of 2500 cps at 25° C. (max) and a white color.

The clay pigment 80 is a fine powder filler having an average equivalent particle diameter of about 0.8 microns. It has a specific gravity of 2.60, a refractive index of 1.50 to 1.60, and a bulking value of 21.7 pounds per gallon. It exhibits a screen residue of 0.01° on a 325 U.S. mesh screen, and has a particle size distribution of 80–82% finer than 2 microns and 3–6% coarser than 5 microns. The clay pigment serves as a filler or bodying agent and ranges from 5 to 15 weight percent of the composition. This product is available from J. M. Huber Corporation, Macon, Ga.

Obviously, other colorants can be employed to formulate a much wider variety of ink colors, the foregoing being exemplary of the invention.

The subject water-based inks can be useful for high-speed printing on vending cups. While the inks are especially useful for printing on thermoplastic materials, they can also be used for printing on paper or metals. The inks offer distinctively improved adhesion to plastic materials, and offer relatively high-gloss and excellent abrasion resistance. If desired, the inks once deposited on the substrates in the form of printing or decoration can be overcoated with the base component only to provide a very shiny appearance and further improved scuff and abrasion resistance. The inks can also be printed on sheet metals as well as film and foam type plastic materials with very good adhesion. The inks possess good lubricity when applied to the various substrates by known printing techniques, such as flexography.

Various modifications of the present invention can be resorted to within the spirit and scope of the appended claims.

I claim:

1. The method of improving the adhesion and abrasion resistance of print on a substrate which comprises adding to an aqueous printing ink a major amount of an aqueous mixture of polyurethane resin and polyethylene resin having a solids ratio ranging from about 1:9 to 1:1 and applying by a printing technique the resultant ink mixture to a substrate.

2. The method in accordance with claim 1, wherein said polyurethane resin and polyethylene resin have a solids ratio of about 1:1.

3. The method in accordance with claim 1, wherein the printing ink is an aqueous flexographic ink.

4. An ink composition consisting essentially of an aqueous printing ink and a major portion of an aqueous mixture of polyurethane resin and polyethylene resin having a solids ratio ranging from about 1:9 to 1:1.

5. The composition in accordance with claim 4, wherein said polyurethane resin and polyethylene resin have a solids ratio of about 1:1.

6. The composition in accordance with claim 1, wherein the printing ink is an aqueous flexographic ink.

7. An aqueous printing ink composition which is abrasion-resistant and water-based comprising a major amount of a physical mixture of polyurethane resin, polyethylene resin and water, said polyurethane resin and polyethylene resin having a solids ratio ranging from about 1:9 to 1:1, and minor amounts of colorant pigment, filler pigment, wax lubricant and anti-foaming agent.

8. The aqueous printing composition in accordance with claim 7, wherein said filler pigment consists of finely-divided clay and ranges from about 5 to 15 weight percent of said composition.

9. The aqueous printing composition in accordance with claim 7, wherein said wax lubricant consists of an exudative wax selected from the group consisting of animal, vegetable and mineral waxes.

10. The aqueous printing composition in accordance with claim 7, wherein said colorant pigment ranges from about 10 to 20 weight percent of said composition.

11. The aqueous printing composition in accordance with claim 7, wherein said printing ink composition is an aqueous flexographic ink.

* * * * *